P. B. STREICH.
DOUGH MOLDING MACHINE.
APPLICATION FILED MAY 29, 1909.
986,413.
Patented Mar. 7, 1911.
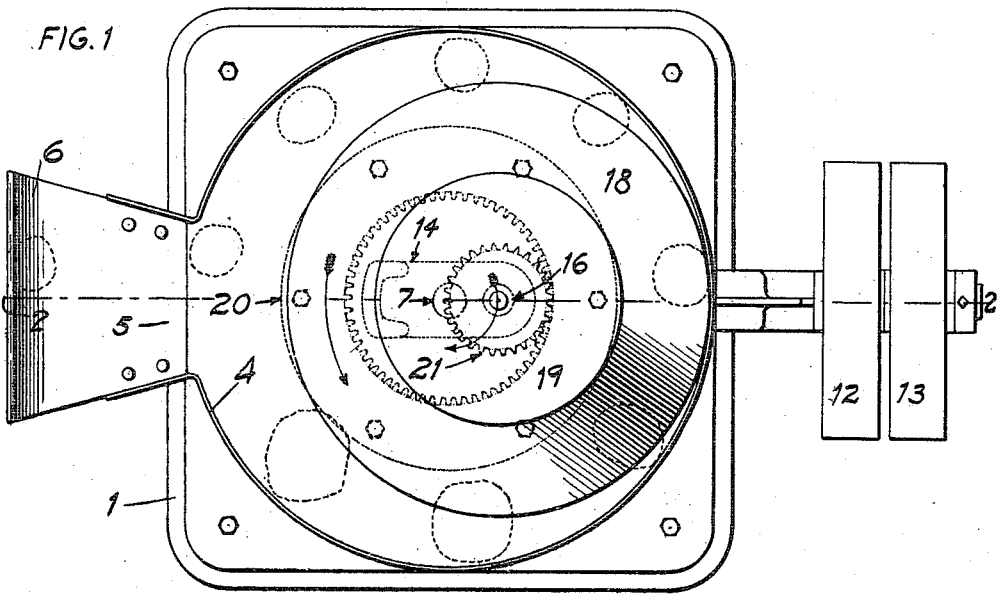
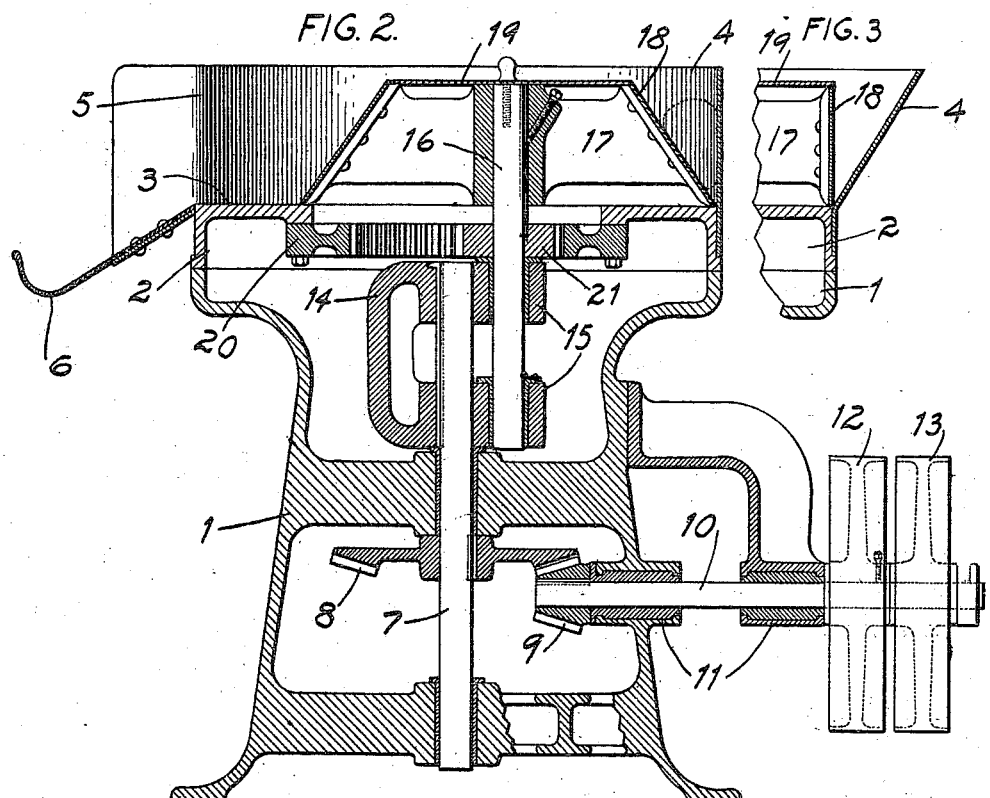
WITNESSES
INVENTOR
PAUL B. STREICH
BY
F. R. Cornwall ATT'Y.
THE NORRIS PETERS CO., WASHINGTON, D. C.

UNITED STATES PATENT OFFICE.

PAUL B. STREICH, OF ST. LOUIS, MISSOURI, ASSIGNOR TO AMERICAN BAKER'S MACHINERY COMPANY, OF ST. LOUIS, MISSOURI, A CORPORATION OF MISSOURI.

DOUGH-MOLDING MACHINE.

986,413. Specification of Letters Patent. Patented Mar. 7, 1911.

Application filed May 29, 1909. Serial No. 499,246.

*To all whom it may concern:*

Be it known that I, PAUL B. STREICH, a citizen of the United States, residing at St. Louis, Missouri, have invented a certain new and useful Improvement in Dough-Molding Machines, of which the following is a full, clear, and exact description, such as will enable others skilled in the art to which it appertains to make and use the same, reference being had to the accompanying drawings, forming part of this specification, in which—

Figure 1 is a plan view of a dough-molding machine of my improved construction. Fig. 2 is a vertical section taken on the line 2—2, Fig. 1. Fig. 3 is a detailed view in section of a modified form of the rotary mold board.

My invention relates to that class of machines utilized for rolling lumps of dough, and molding the same into spherical or ellipsoidal form, at the same time stretching the skin of the lumps of dough over the top and sides and drawing said skin to the bottom of the lump, thus giving said lump a smooth surface, which is especially desirable in the manufacture of bread.

The object of my invention is to provide a simple, inexpensive machine which can be operated with little power and which is provided with a rotary mold board which intermittently engages and kneads, or rolls, the lumps of dough in a manner similar to manual manipulation, during which action the skin of the individual lump of dough is drawn downwardly over the sides of the lump to a point at the bottom thereof, thus forming a dough-loaf having a smooth surface of uniform texture or consistency throughout its body and in proper condition to be placed in the oven.

To the above purpose, my invention consists in certain novel features of construction and arrangement of parts, hereinafter more fully set forth and claimed.

Referring by numerals to the accompanying drawings, 1 designates the frame of my improved machine, on the upper portion of which is arranged a ring 2, the flat top surface 3 of which forms a table over which the lumps of dough are rolled during their passage through the machine. Fixed to the ring 2 is the lower portion of a vertically disposed wall 4, there being an opening 5 in one side of said wall and projecting downward from the ring 2 beneath this opening is a chute or hopper 6 into which the lumps of dough gravitate after passing through the machine.

Arranged for rotation in suitable bearings in the center of the frame 1 is a vertically-disposed shaft 7, on the lower portion of which is fixed a miter-gear wheel 8, with which meshes a pinion 9 fixed on the inner end of the longitudinally-disposed shaft 10. This latter shaft is arranged for rotation in suitable bearings 11, and located on the outer end of said shaft 10 are the tight and loose pulleys 12 and 13.

Fixed on the upper portion of the shaft 7 is a frame or bracket 14, in which is formed a pair of vertically-alined bearings 15, and journaled for rotation in these bearings is a shaft 16. The upper portion of this shaft 16 projects above the ring 2 and fixed on said upper portion is a spider 17 carrying a dough-rolling or molding board which is in the form of the frustum of a cone, comprising the inclined side wall 18 and the flat top 19. The inclined wall 18 is approximately as high as is the wall 4, and the lower edge of said inclined wall 18 rides directly upon the top surface 3 of the ring 2, and the diameter of the bottom of the dough-rolling board is such that one portion thereof is always in contact with or close to the inner surface of the wall 4.

Fixed to the under side of the ring 2 at the inner edge thereof is a circular rack 20, and meshing with the top thereof is a pinion 21 which is fixed upon the shaft 16.

When my improved machine is in operation, the driving belt is shifted from the loose pulley 13 onto the tight pulley 12, and the rotary motion of the shaft 10, carrying said tight pulley, is imparted to the shaft 7 by means of the pinion 9 meshing with the miter-gear wheel 8. The frame or bracket 14, carrying the shaft 16, is fixed upon the shaft 7, and, therefore, rotates therewith; as a result of this movement, the shaft 16 and the parts carried thereby are caused to revolve with the shaft 7 as an axis. As the shaft 16 and the mold board carried thereby revolve, they are simultaneously rotated by reason of the pinion 21 engaging with the teeth of the circular rack 20 and the direction of rotation of the mold board being opposite the direction in which said mold board revolves.

The wall 18 which forms the movable dough molding element of my improved machine, has a gyratory movement during operation, due to the combined rotary and revolving movements of the shaft 16, and during the gyratory movement of said molding element, the lumps of dough are intermittently engaged, and simultaneously rotated and compressed.

The lumps of dough are delivered onto the surface 3 of the ring 2 at a point to one side of the opening 5, and as the rotating mold board successively engages the lumps of dough, due to the revolving motion of said board, said dough lumps will be rotated and at the same time compressed to a certain extent, between the inner surface of the wall 4 and the surface of the wall 18. As the space between said walls is approximately wedge-shaped, or tapers toward the bottom, the frictional engagement between the surface of said walls and the skin of the lumps of dough will result in pulling or drawing the skin downward over the sides of the lump to a point at the bottom thereof.

The speed at which the mold board rotates is comparatively greater than is the speed of revolution of said mold board, and for this reason, and by reason of the revolving motion of the mold board, the lumps of dough are intermittently moved along the inner surface of the wall 4 and each individual lump of dough is uniformly acted upon by the rotary mold board during the passage of said lumps of dough through the machine. This action uniformly rolls the lumps of dough and molds the same into the proper shape and draws the skin over the surface of the lumps so that the same are perfectly smooth and in proper condition to be placed in the oven.

After the lumps of dough pass through the machine and have been acted upon by the rotating and revolving dough board, they are discharged into the chute or hopper 6 from which they are removed and placed in the pans or ovens.

In Fig. 3 I have illustrated a modification, wherein the wall 4 is inclined and the wall 18 occupies a vertical position, this construction being merely the reverse of the preferred construction shown in Figs. 1 and 2.

Having thus described my invention, what I claim is:

1. In a machine of the class described a gyrating dough molding element the outer face of which is adapted to engage the lumps of dough.

2. In a machine of the class described, a gyrating dough molding element, the outer face of which is inclined and adapted to engage with the lumps of dough.

3. In a machine of the class described, a dough molding element having an inclined outer face adapted to engage the lumps of dough, and means whereby said element is simultaneously revolved and rotated.

4. In a machine of the class described a fixed table, an annular wall thereon, a rotating dough molding element arranged for operation on the table within the wall, and means whereby said element moves to and from the wall as it rotates therein.

5. In a machine of the class described, the combination with a wall, of a dough-molding element arranged to gyrate within the wall.

6. In a machine of the class described, the combination with a wall, of a dough-molding element arranged therein and means whereby said element is gyrated.

7. In a machine of the class described, a table, a wall arranged thereon, and a dough molding element arranged to gyrate on the table within the wall.

8. In a machine of the class described, a wall, a dough-molding element arranged to gyrate within the wall, there being a space between the face of the wall and the dough-engaging face of the molding element, which tapers gradually from top to bottom.

9. In a machine of the class described, a pair of dough-engaging elements, one of which gyrates and the opposite one of which is stationary, and the space between said elements being narrower at the bottom than at the top.

10. In a machine of the class described, a fixed wall, and means operating within said wall for intermittently engaging lumps of dough for simultaneously revolving and compressing the same against the wall.

11. In a machine of the class described, a wall forming a dough molding board and a gyrating element arranged for operation inside the wall for intermittently engaging lumps of dough and pressing the same against the wall.

12. In a machine of the class described, a wall forming a dough molding board and a revolving rotating dough molding element, the speed of rotation of said element being greater than the speed of revolution.

13. In a machine of the class described, a wall, a dough molding element arranged for operation adjacent the wall, which element revolves and rotates at differential speeds.

14. In a machine of the class described an annular wall forming a dough molding board, a circular molding board within the wall and means whereby said circular molding board is gyrated so as to intermittently engage lumps of dough and simultaneously revolve and compress the same against the wall.

In testimony whereof I hereunto affix my signature in the presence of two witnesses, this 27th day of May, 1909.

PAUL B. STREICH.

Witnesses:
 ALMA GEBHART,
 LENORE CLARK.

Copies of this patent may be obtained for five cents each, by addressing the "Commissioner of Patents, Washington, D. C."